(12) United States Patent
Keller

(10) Patent No.: US 12,060,253 B2
(45) Date of Patent: Aug. 13, 2024

(54) INDUSTRIAL TRUCK

(71) Applicant: HUBTEX MASCHINENBAU GMBH & CO. KG, Fulda (DE)

(72) Inventor: Juergen Keller, Grossenlueder (DE)

(73) Assignee: HUBTEX MASCHINENBAU GMBH & CO. KG, Fulda (DE)

( * ) Notice: Subject to any disclaimer, the term of this patent is extended or adjusted under 35 U.S.C. 154(b) by 380 days.

(21) Appl. No.: 17/610,448

(22) PCT Filed: Mar. 12, 2020

(86) PCT No.: PCT/EP2020/056652
§ 371 (c)(1),
(2) Date: Nov. 11, 2021

(87) PCT Pub. No.: WO2020/229019
PCT Pub. Date: Nov. 19, 2020

(65) Prior Publication Data
US 2022/0219961 A1    Jul. 14, 2022

(30) Foreign Application Priority Data

May 14, 2019   (DE) ............... 10 2019 112 580.4

(51) Int. Cl.
*B66F 9/07*   (2006.01)
*B66F 9/20*   (2006.01)
*B64F 1/32*   (2006.01)

(52) U.S. Cl.
CPC . *B66F 9/20* (2013.01); *B64F 1/32* (2013.01)

(58) Field of Classification Search
CPC ................ B66F 9/20; B66F 9/07; B64F 1/32
See application file for complete search history.

(56) References Cited

U.S. PATENT DOCUMENTS

| | | | | |
|---|---|---|---|---|
| 777,530 A | * | 12/1904 | McCarthy | B66F 9/07 187/244 |
| 831,518 A | * | 9/1906 | McCarthy | B66F 9/07 187/244 |
| 3,136,433 A | | 6/1964 | Inghram | |
| 3,225,867 A | * | 12/1965 | Inghram | B64F 1/322 187/244 |
| 3,268,033 A | * | 8/1966 | Goodacre | B66F 9/06 187/230 |
| 3,606,039 A | * | 9/1971 | Arnott | B65G 1/0407 188/58 |

(Continued)

FOREIGN PATENT DOCUMENTS

| DE | 2 225 435 A1 | 1/1973 |
|---|---|---|
| DE | 101 33 815 A1 | 2/2003 |

(Continued)

*Primary Examiner* — Saul Rodriguez
*Assistant Examiner* — Lucia Elba Rodriguez
(74) *Attorney, Agent, or Firm* — Norman B. Thot

(57) ABSTRACT

An industrial truck includes a loading platform and two masts which are arranged opposed to each other. The two masts lift and lower the loading platform which is arranged between the two masts in a lifting and lowering direction. Each of the two masts includes two pulleys which are arranged spaced apart in the lifting and lowering direction, a flexible pulling device which revolves around each of the two pulleys, and a drive device which rotationally drives at least one of the two pulleys.

10 Claims, 18 Drawing Sheets

(56) References Cited

U.S. PATENT DOCUMENTS

| | | |
|---|---|---|
| 2007/0140817 A1 | 6/2007 | Hansl |
| 2013/0087430 A1* | 4/2013 | Kirk ........................ B65G 15/52 198/779 |
| 2015/0246799 A1* | 9/2015 | Mizelmoe ........... B66F 9/07577 182/69.5 |
| 2017/0121109 A1* | 5/2017 | Behling .............. B66F 9/07513 |

FOREIGN PATENT DOCUMENTS

| | | |
|---|---|---|
| DE | 20 2004 020 224 U1 | 6/2005 |
| DE | 10 2005 037 575 A1 | 2/2006 |
| DE | 10 2012 000 197 A1 | 7/2013 |
| EP | 3 064 466 A1 | 9/2016 |
| WO | WO 2005/087648 A1 | 9/2005 |
| WO | WO 2015/074755 A2 | 5/2015 |

* cited by examiner

INDUSTRIAL TRUCK

CROSS REFERENCE TO PRIOR APPLICATIONS

This application is a U.S. National Phase application under 35 U.S.C. § 371 of International Application No. PCT/EP2020/056652, filed on Mar. 12, 2020 and which claims benefit to German Patent Application No. 10 2019 112 580.4, filed on May 14, 2019. The International Application was published in German on Nov. 19, 2020 as WO 2020/229019 A1 under PCT Article 21(2).

FIELD

The present invention relates to an industrial truck comprising opposing masts for lifting and lowering a loading platform which is located between the masts in a lifting and lowering direction.

The present invention in particular relates to an industrial truck which is used to transport air freight shipment pallets or containers.

BACKGROUND

An industrial truck of this type has previously been described under the name "Xway Mover 7000" from DIMOS Maschinenbau GmbH. In this industrial truck, four masts are described for lifting and lowering, each of which is equipped with a hydraulic cylinder. Hydraulic fluid is applied to each hydraulic cylinder independently from each other.

The disadvantage of this vehicle is that it is expensive to manufacture and that the maximum achievable lift heights cannot or can only be adapted to various requirements with a high constructive effort.

SUMMARY

An aspect of the present invention is to provide an industrial truck which is improved in this regard.

In an embodiment, the present invention provides an industrial truck which includes a loading platform and two masts which are arranged opposed to each other. The two masts are configured to lift and to lower the loading platform which is arranged between the two masts in a lifting and lowering direction. Each of the two masts comprises two pulleys which are arranged spaced apart in the lifting and lowering direction, a flexible pulling device which is configured to revolve around each of the two pulleys, and a drive device which is configured to rotationally drive at least one of the two pulleys.

BRIEF DESCRIPTION OF THE DRAWINGS

The present invention is described in greater detail below on the basis of embodiments and of the drawings in which.

DETAILED DESCRIPTION

Figure 1:
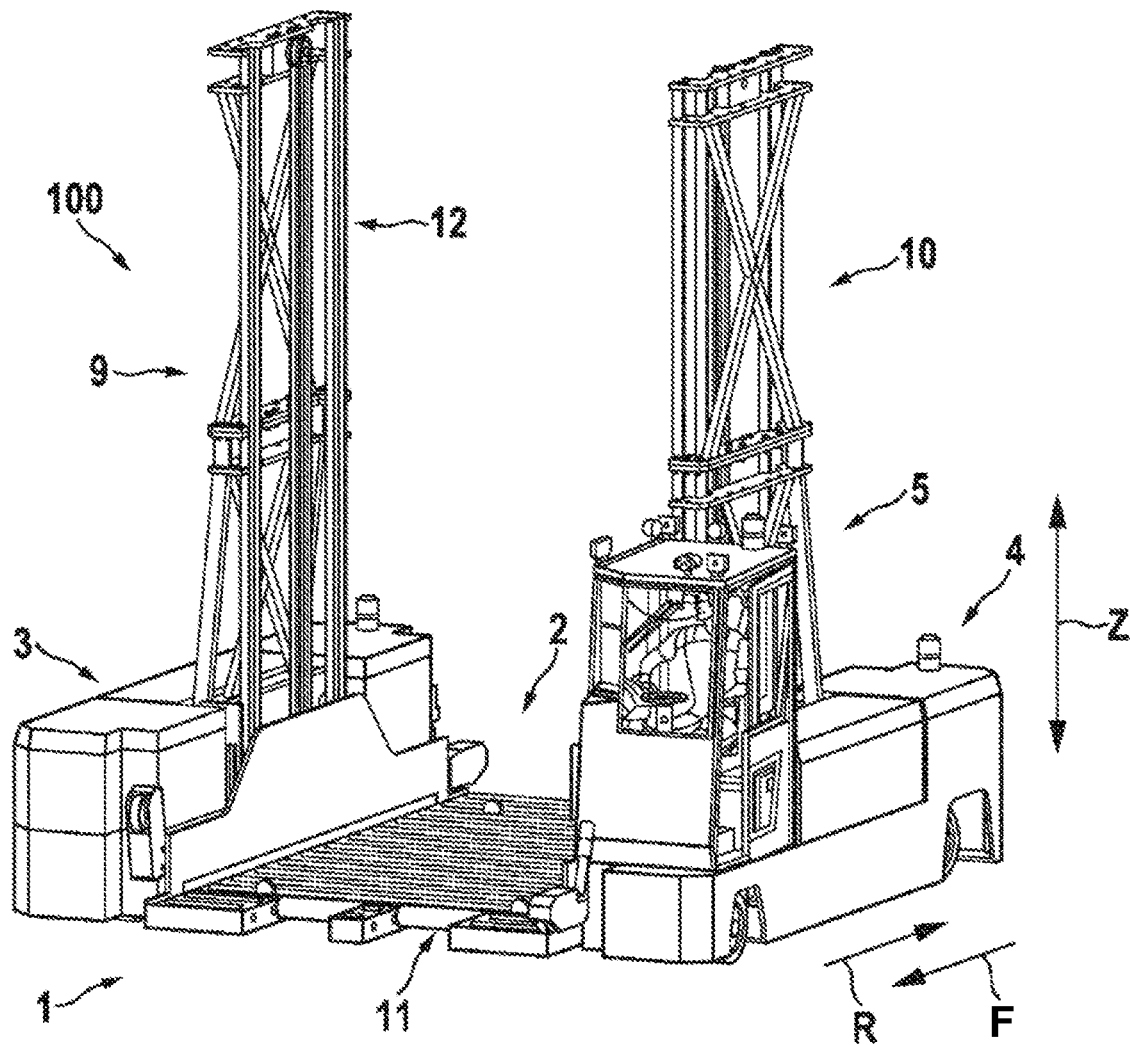
FIG. 1 is a first perspective view of an embodiment of an industrial truck according to the present invention.
Figure 2:
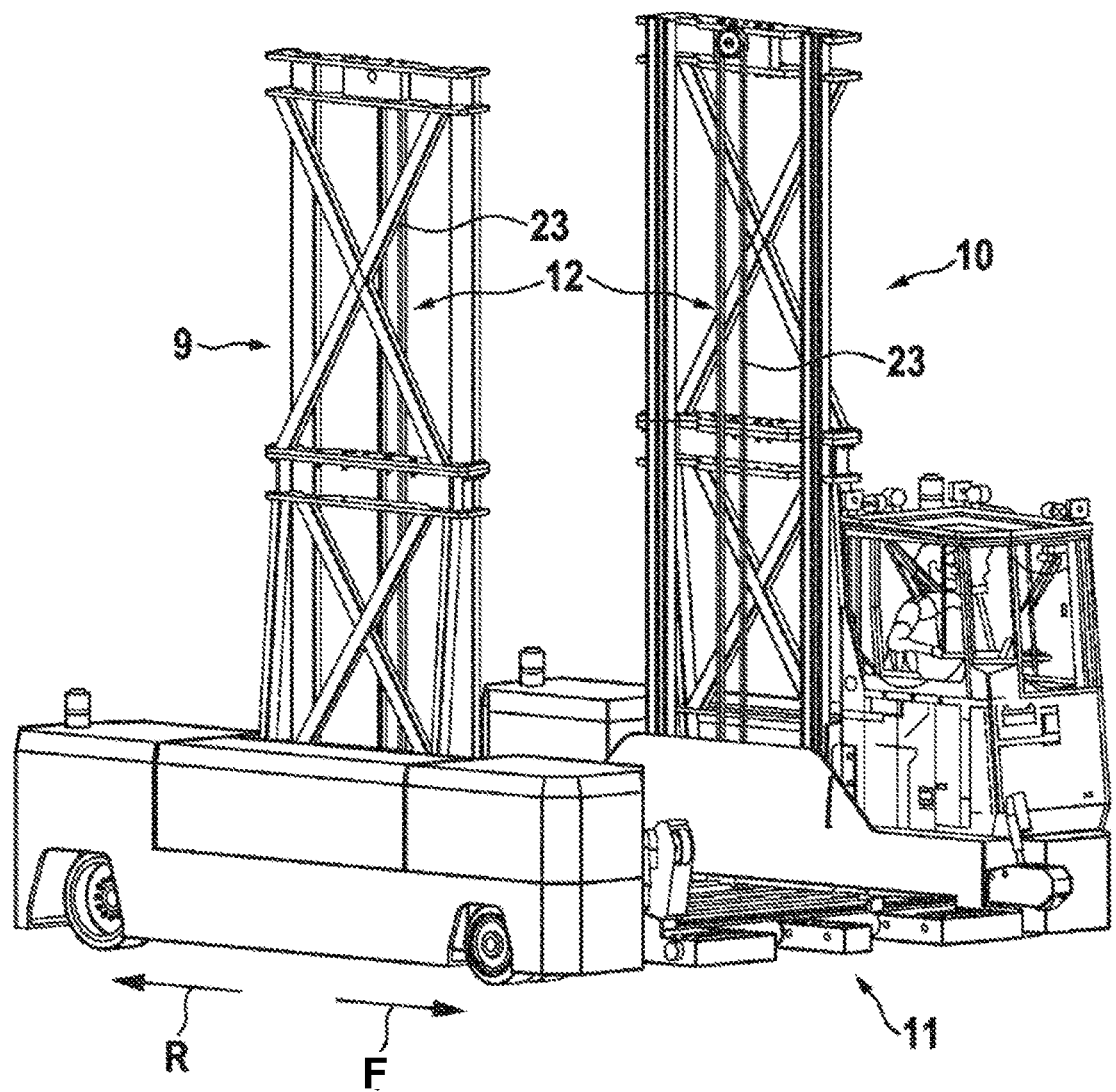
FIG. 2 is a second perspective view of the same embodiment.
Figure 3:
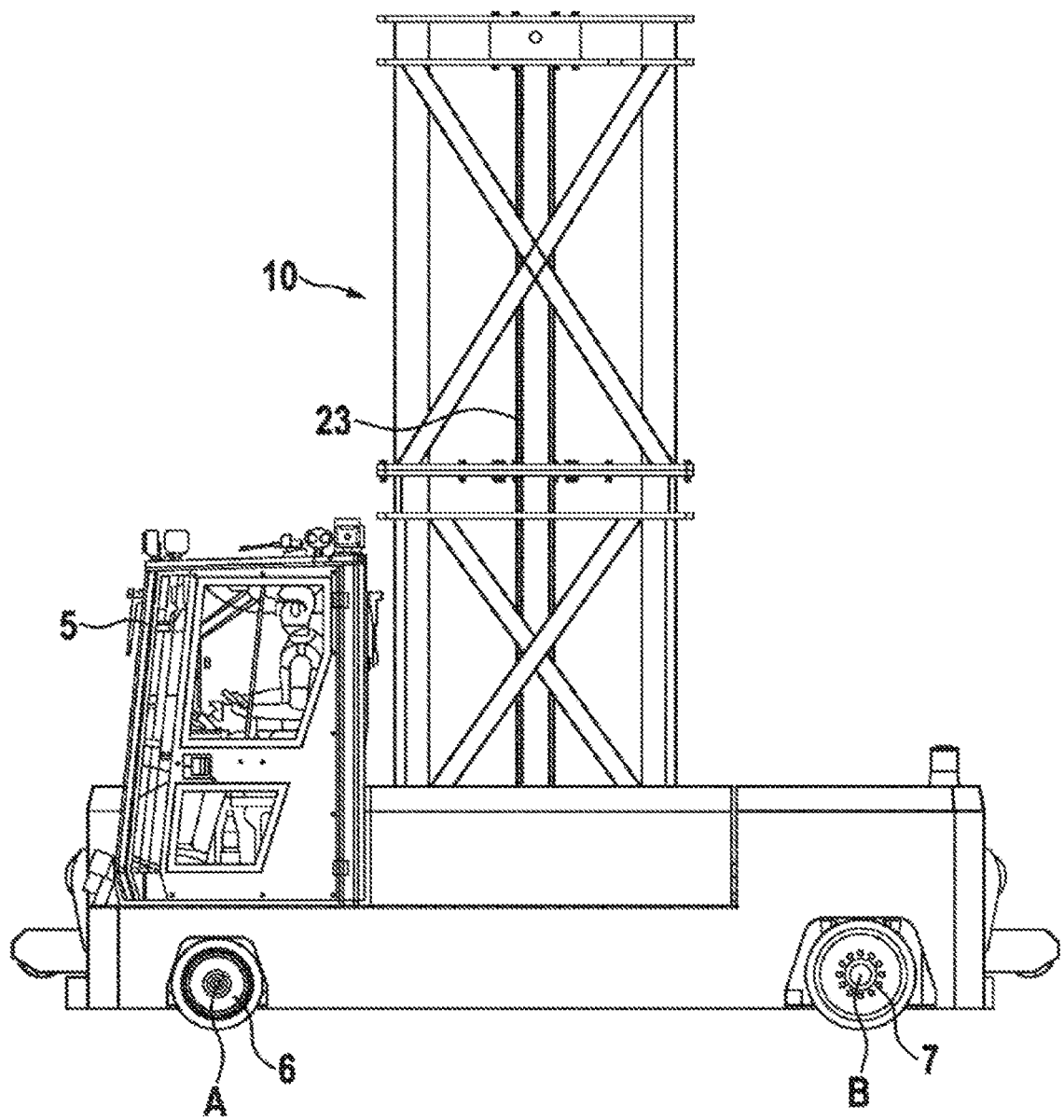
FIG. 3 is a side view of the same embodiment.
Figure 4:
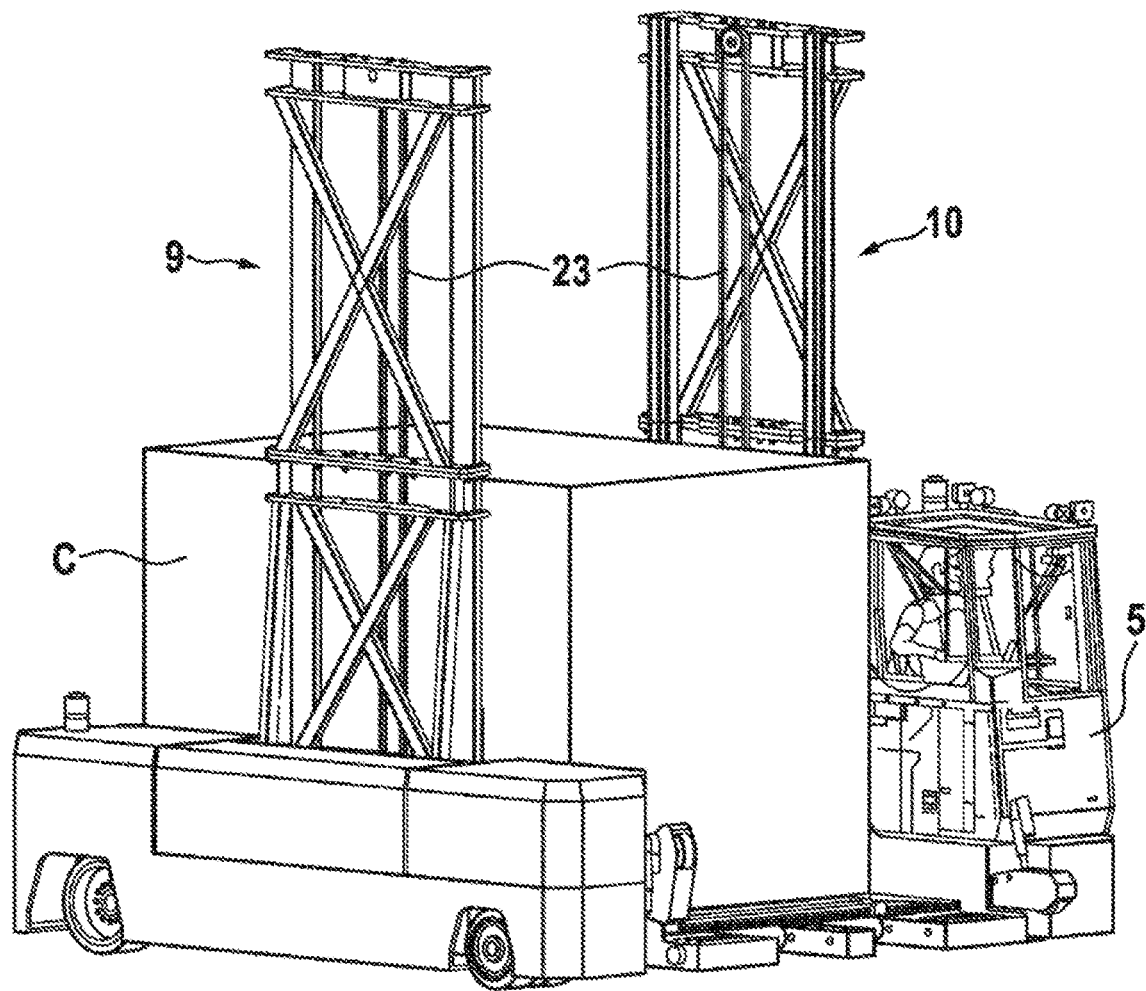
FIG. 4 is a view corresponding to FIG. 2 of the same embodiment, but loaded with a transport container.

In the industrial truck according to the present invention, each of the masts comprises two pulleys which are spaced apart in the lifting and lowering direction and around which a flexible pulling device revolves, at least one of the pulleys being rotationally driven by a drive device. This arrangement replaces at least one of the lifting cylinders provided in the vehicle as described in the prior art. The industrial truck according to the present invention can be produced significantly more cost-effectively. The drive device can, for example, also comprise an electric motor so that complex piping and hydraulic pumps can be completely dispensed with, which further reduces the manufacturing cost of the industrial truck according to the present invention.

The pulleys, which are spaced apart from one another, can, for example, be arranged so that the flexible pulling device comprises two strands extending in the lifting and lowering directions. The loading platform must then only be mechanically connected to one of the strands for lifting and lowering.

The loading platform can, for example, be connected to two parallel strands of the flexible pulling device of the two masts. The load which the industrial truck according to the present invention is suitable for lifting can thereby be increased. This measure also increases the operational safety of the industrial truck according to the present invention since, in the event of a failure of one of the two flexible pulling devices, for example, by being torn off, an uncontrolled lowering of the loading platform can be prevented.

A further development of the industrial truck according to the present invention provides that at least one of the lower pulleys of the two masts can, for example, be non-rotatably connected to the drive shaft of a drive device and the two lower pulleys of the two masts can, for example, be mechanically connected to one another via a connecting shaft. A synchronization of the two flexible pulling devices of the two masts is thereby provided. It is thereby also possible to in principle only provide a single drive device.

However, both lower pulleys of the two masts to the drive shaft of a separate drive device can, for example, be non-rotatably connected. This allows the achievable lifting capacity to be increased and increases the operational safety of the industrial truck according to the present invention since, even if a drive device fails, the loading platform can be raised and lowered, albeit with reduced power.

In a further development of the industrial truck according to the present invention, at least one of the two pulleys of each mast can, for example, be mounted in a bearing block which is arranged in a bearing block receptacle of the corresponding mast so that it can be moved in a tensioning direction. The tension of the flexible pulling device that is required for a trouble-free operation can thereby be set in a simple manner. It is thereby also easily possible to, if necessary, relax the flexible pulling device which may, for example, be necessary for an exchange.

The flexible pulling means can be designed in a variety of ways, for example, as a chain, a toothed belt, a ribbed belt, a V-belt, etc. The pulleys are adapted to the corresponding design of the flexible pulling device.

In an embodiment of the industrial truck according to the present invention, each flexible pulling device can, for example, have two parallel V-belts, and the pulleys are accordingly designed as double belt pulleys. The use of two parallel V-belts again increases the operational safety of the industrial truck according to the present invention.

In an additional further development of the industrial truck according to the present invention, each of the masts can, for example, comprise a first main frame, to which at least one second main frame can optionally be attached. In other words, in this development, the masts are of modular design, each module comprising a main frame. Only a main frame must be added to change the length of the mast and the associated change in the maximum achievable lifting height. One of the main frames must be removed if a plurality of main frames are already connected to one another and the length of the mast is to be reduced. The previously used flexible pulling device must be replaced by one with an adapted length. This development of the industrial truck according to the present invention makes it possible to subsequently also easily adapt industrial trucks delivered with a specific, maximum lifting height to requirements that have changed with regard to the desired lifting height.

The attachability of a second main frame to a first main frame is particularly simple if the first main frame has, for example, an upper cross strut and the lower main frame has a lower cross strut, the lower cross strut being designed to be attachable to the upper cross strut.

In an embodiment, the industrial truck according to the present invention can, for example, comprise steering motors and travel drives which are also designed to be electrically operated. This development of the industrial truck according to the present invention is again characterized by a particularly low manufacturing cost since the operation of the vehicle is only possible from a single energy source, i.e., an electrical power storage device.

The present invention will be explained in greater detail below under reference to the drawings.

The embodiment of an industrial truck according to the present invention (hereinafter "industrial truck 100" for short) shown in the drawing comprises a chassis 1 with a loading region 2 which is delimited by side regions 3, 4. In the two side regions 3 and 4, components (which are not recognizable in the drawing) are accommodated that are required in the operation of the industrial truck, for example, energy storage devices such as fuel tanks and accumulators, drive devices for driving and lifting functions, electrical and hydraulic circuits for regulating or controlling the drive and lifting operations as well as for steering the industrial truck, etc.

In FIG. 1, the forward and reverse directions of travel F, R are symbolized by the arrows F, R.

A driver's cab 5 is arranged in the front region of the left-hand side region 4 as seen in the forward direction of travel F. The driver's cab 5 comprises the actuation devices required to operate the industrial truck 100, such as buttons, switches, joysticks, and a steering wheel.

Figure 5:
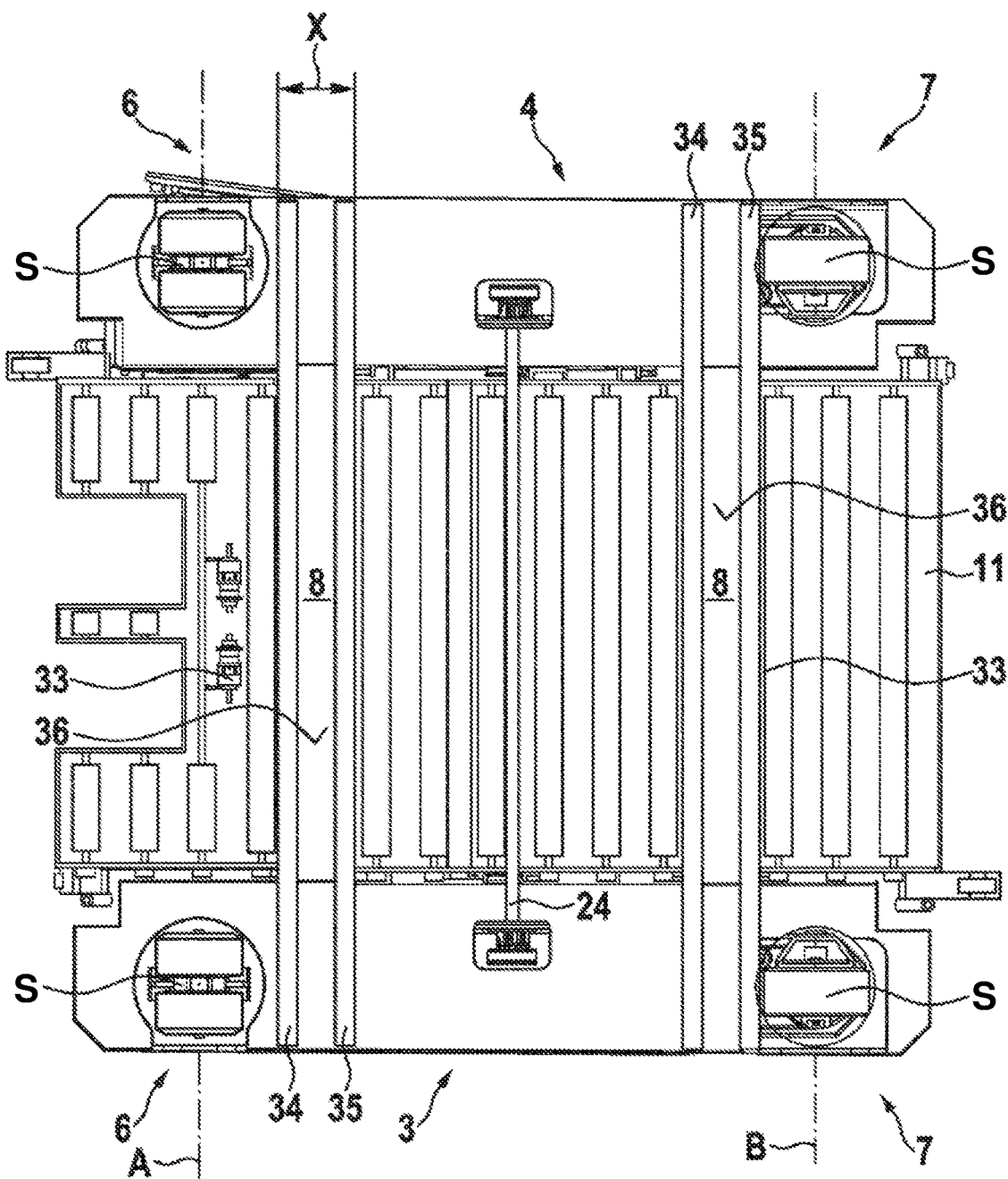
FIG. 5 is a view from below of the same embodiment.
Figure 6:
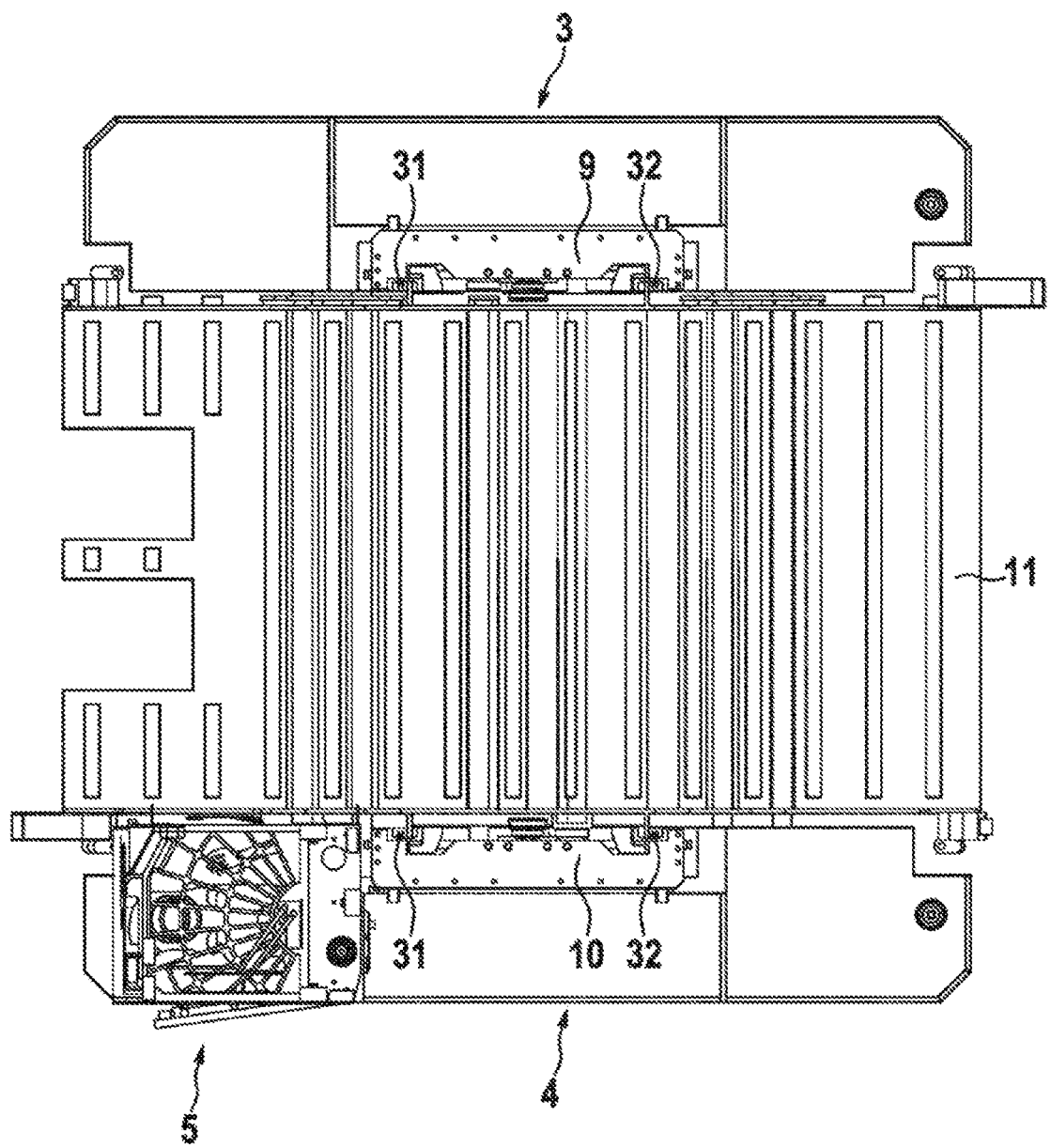
FIG. 6 is a view from above of the same embodiment.

As can in particular be seen in FIG. 5, the industrial truck 100 has four wheels, the front wheels 6 assigned to the front axle A being designed as twin wheels and the rear wheels 7 assigned to the rear axle B being designed as individual wheels. All of the four wheels are designed to be steerable so that they can be rotated through 360° about their corresponding steering axle S. Each of the wheels 6, 7 is connected to its own steering motor (which is not shown in the drawings). All steering motors can, for example, be designed as electric motors and be controlled via a steering computer so that the industrial truck 100 can change the direction of travel in any sequence without stopping. A loading or unloading station can thus be approached directly without complex maneuvering.

At least one of the front wheels 6 and rear wheels 7 is coupled to a travel drive. In order to improve traction, all front wheels 6 and rear wheels 7 can, for example, each be coupled to a travel drive. The travel drive(s) can, like the steering motors, comprise electric motors.

As can be seen in FIG. 5, the chassis 1 has two cross members 8 which extend parallel to one another and which are arranged between the front axle A and the rear axle B. The two cross members 8 connect the side regions 3 and 4. The cross members 8 are arranged close to the ground and have a comparatively low overall height Y compared to the transverse extension X, so that only a low loading and unloading height H can be achieved with the industrial truck 100, as will be explained in more detail below.

Two masts 9, 10 extend upward from the chassis 1. The facing sides of the two masts 9, 10 are arranged at least almost flush with sides of the side regions 3, 4 facing one another.

The two masts 9, 10 are used to raise and lower a loading platform 11 in a lifting and lowering direction Z. It is used to carry a load, for example, a container C. For this purpose, each mast 9, 10 has a flexible pulling device 12 which revolves around a lower pulley 13 and an upper pulley 14. In the illustrated embodiment, the flexible pulling device 12 comprises two V-belts running parallel to one another. They are stretched between the lower and upper pulleys 13, 14, which are designed as double belt pulleys. While the upper pulley 14 is mounted in a bearing block 15 which is stationary so as to be freely rotatable about an axis 16, the lower pulley 13 is non-rotatably connected to the drive shaft 17 of a drive device 18. The drive device 18 can, for example, also comprise an electric motor.

Figure 12:
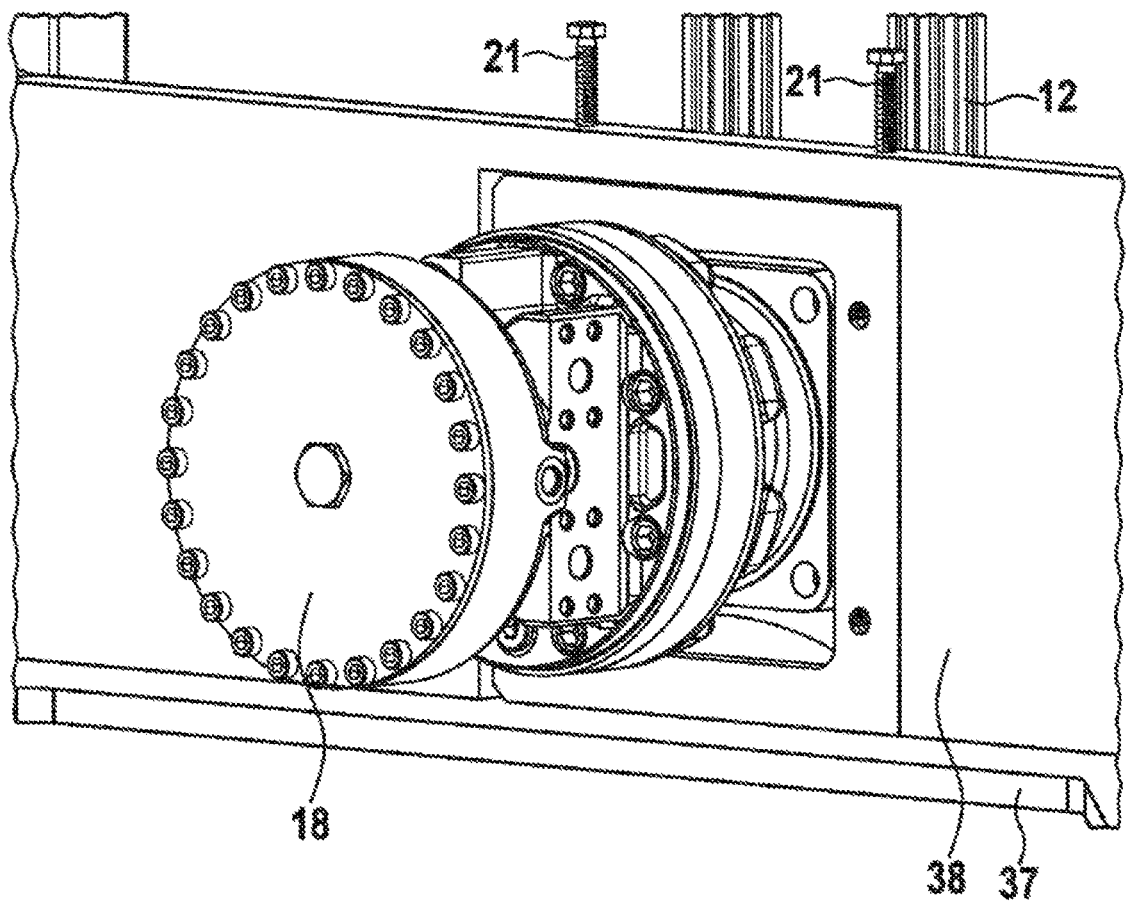
FIG. 12 is a detailed view of a drive device of this mast.
Figure 13:
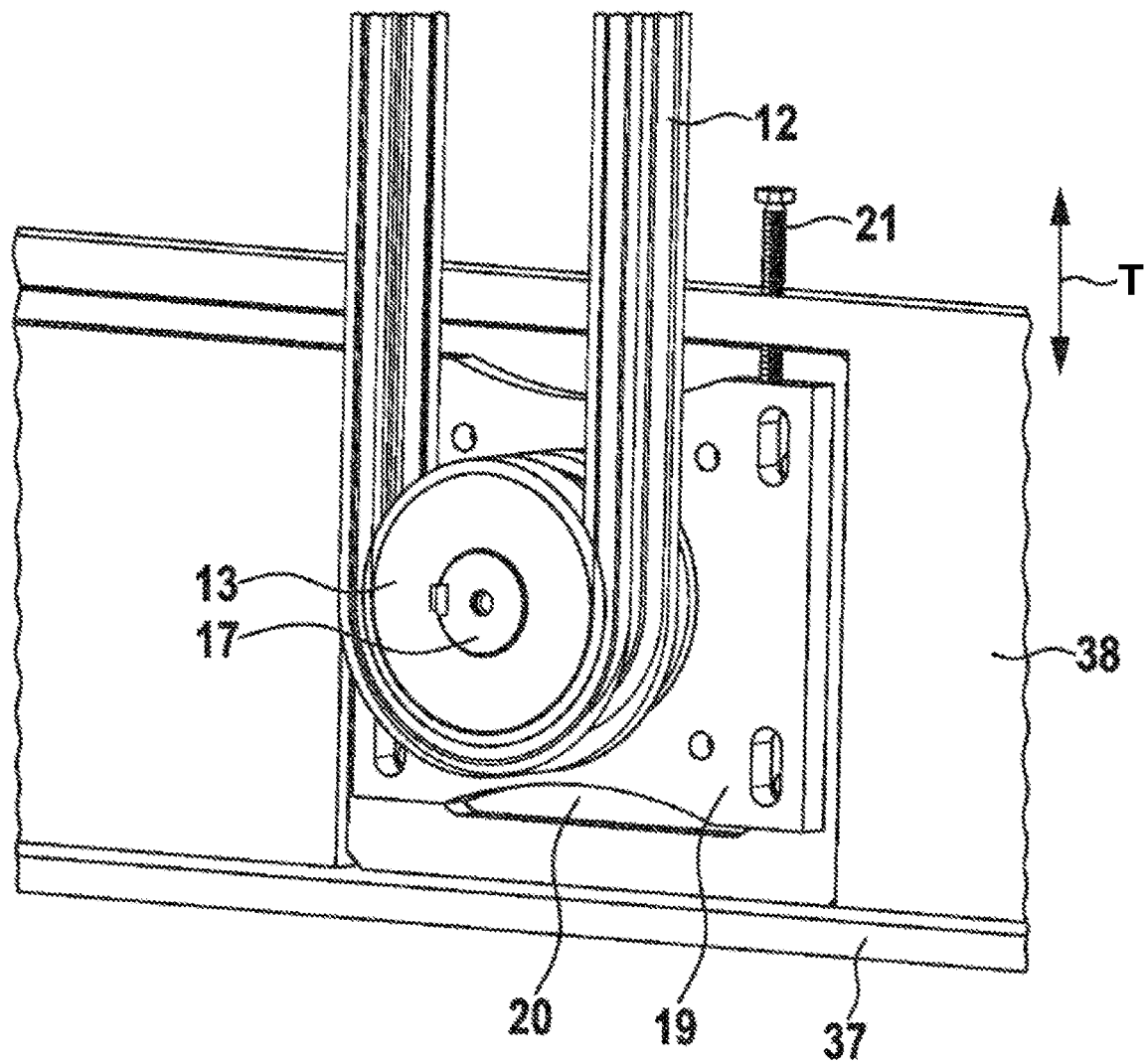
FIG. 13 shows a machine element which is driven in rotation via the drive device and which interacts with a flexible pulling device.
Figure 14:
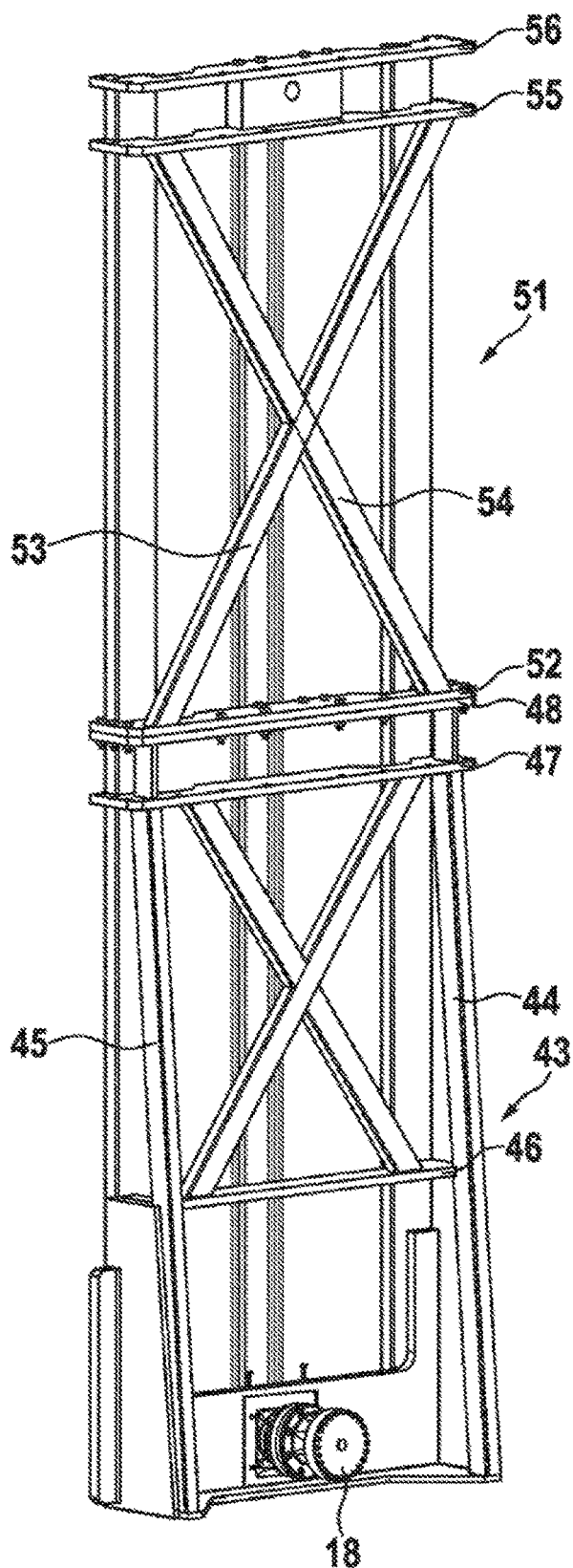
FIG. 14 is a perspective rear view of a second embodiment of a mast.
Figure 15:
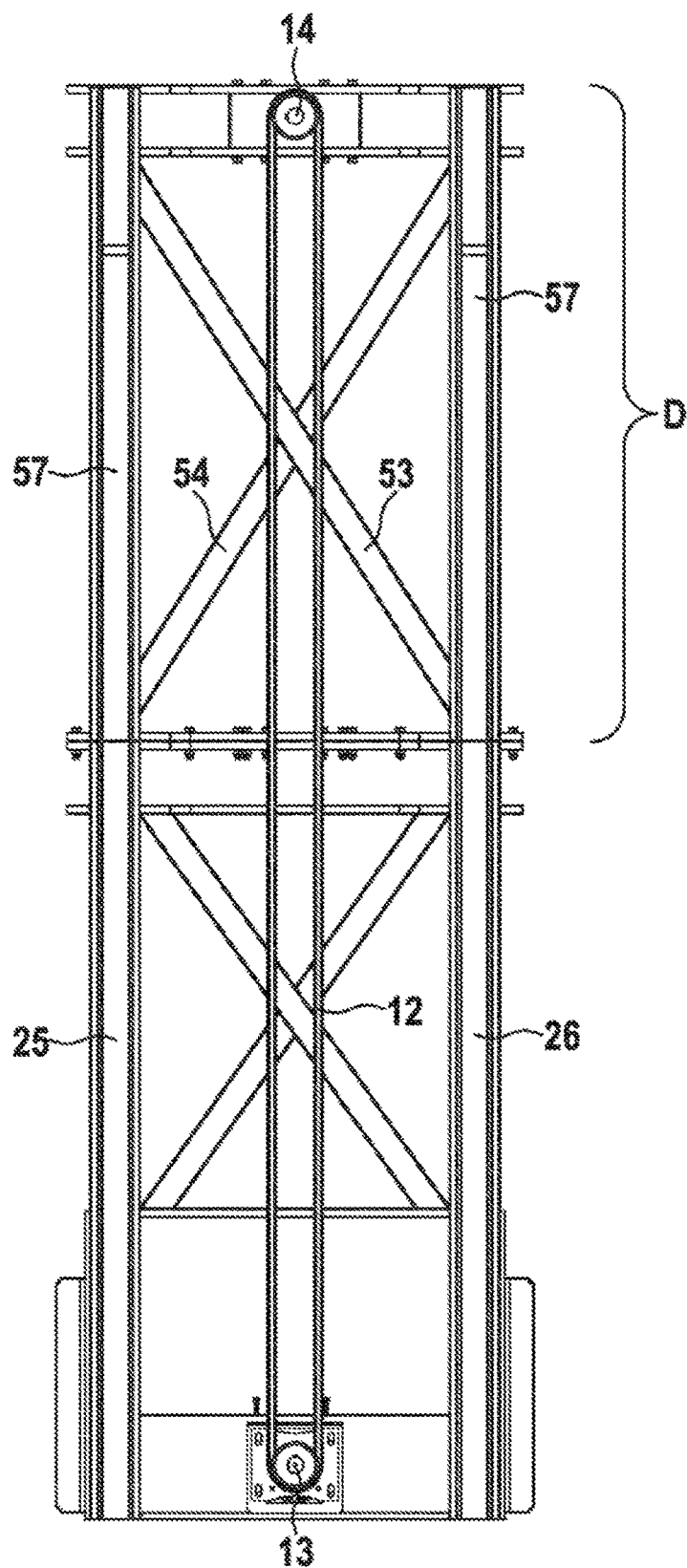
FIG. 15 is a plan view of the front side of the same mast.
Figure 16:
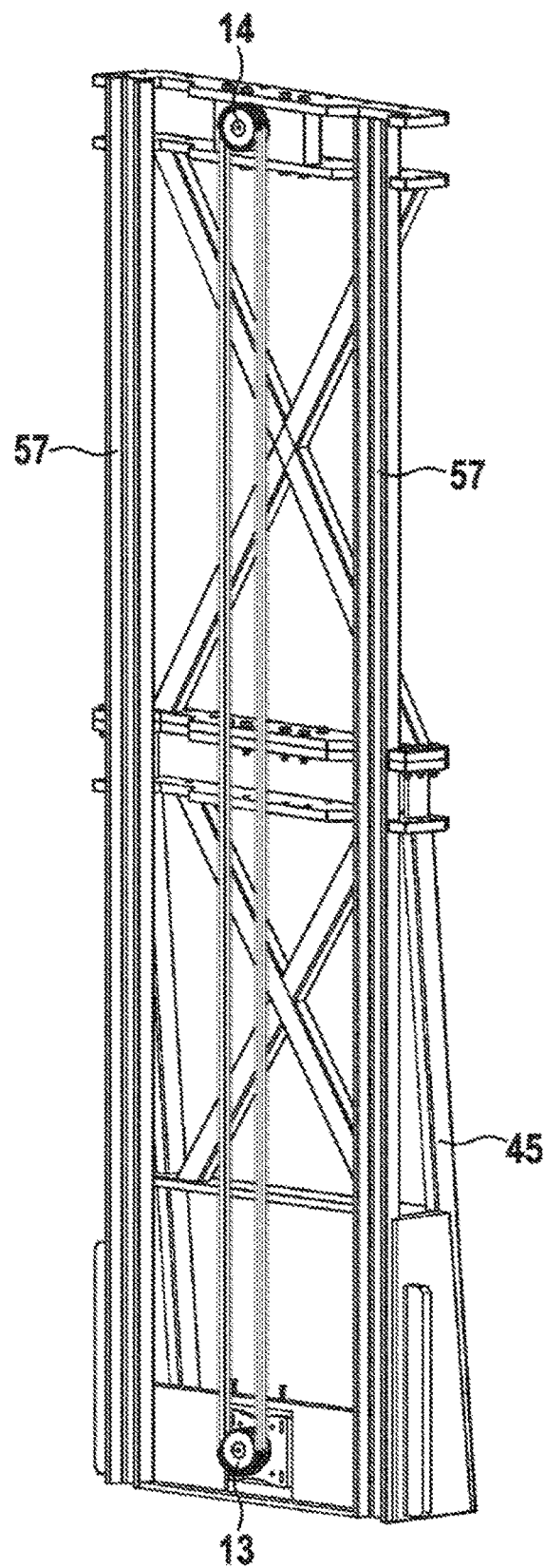
FIG. 16 is a perspective front view of the same mast.
Figure 17:
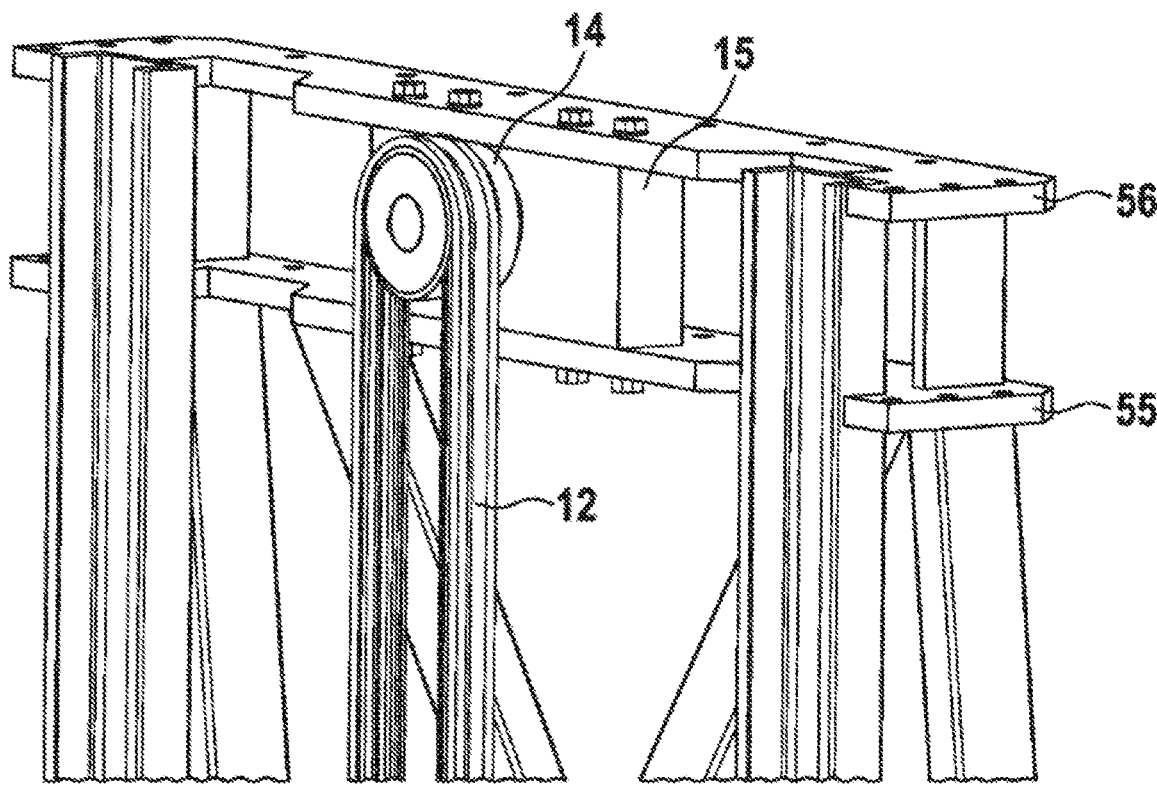
FIG. 17 is a perspective detail view of the upper region of a mast.
Figure 18:
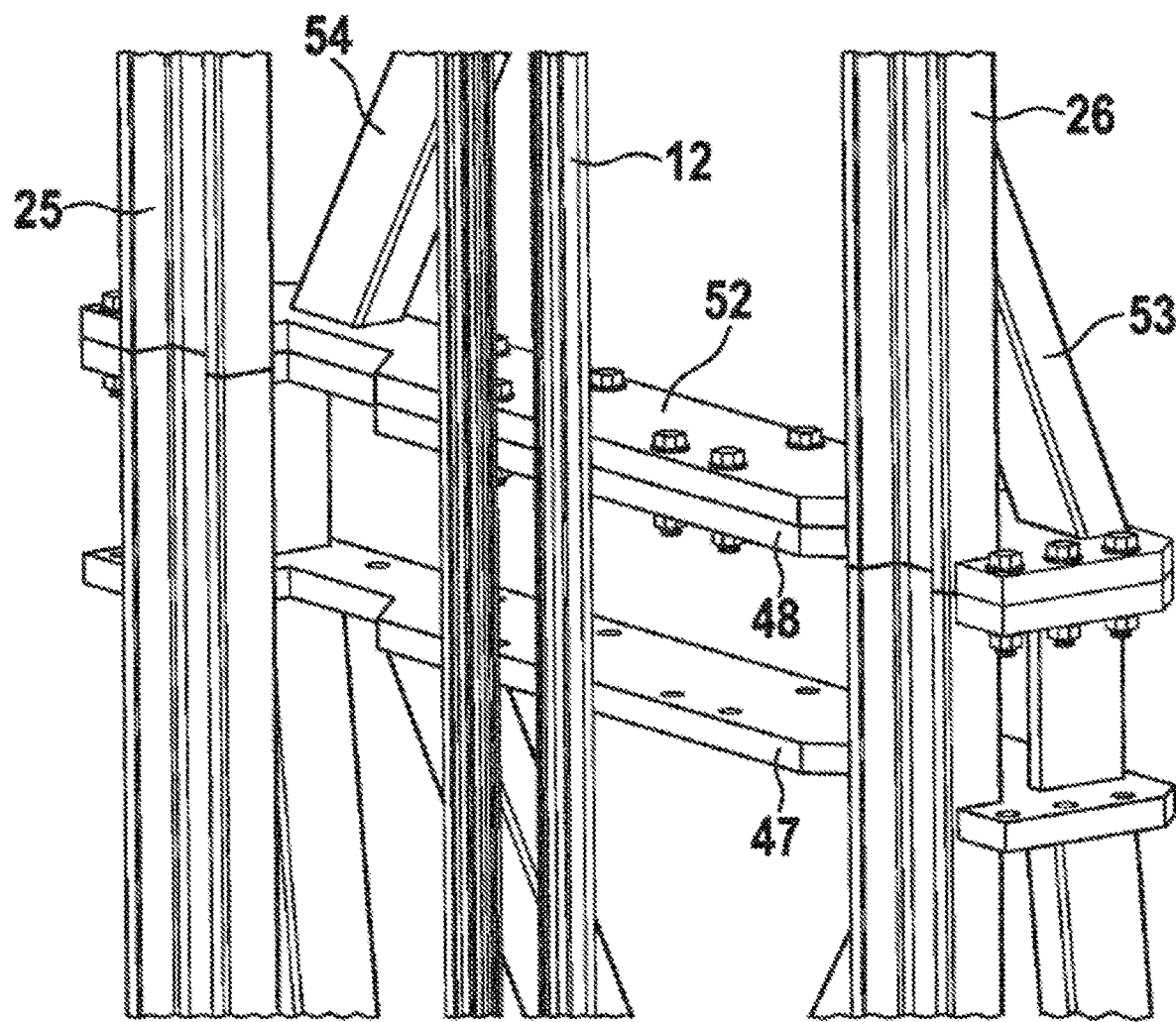
FIG. 18 is a detail view of the central region of the embodiment of the mast shown in FIGS. 14 to 16.

The drive device 18 is mounted on a bearing block 19 which is arranged displaceably on the mast 9, 10 for the purpose of adjusting the tension of the flexible pulling device 12 (see in particular FIGS. 12 and 13). For this purpose, the masts 9, 10 each have a bearing block receptacle 20 which is larger in the tensioning direction T than the bearing block 19. According to FIGS. 12 and 13 from above, two threaded bores open into the bearing block receptacle 20, into each of which a clamping screw 21 is screwed. The front end of each of the clamping screws 21 in the screwing-in direction is supported on a surface of the bearing block 19. As is evident from FIGS. 12 and 13, the tension of the flexible pulling device 12 can be changed by turning the clamping screws 21 in and out.

The flexible pulling device 12 has two strands 22, 23 which run parallel to one another due to their revolving around the lower and upper pulleys 13, 14. The drive shafts 17 of the two drive devices 18 of the masts 9, 10 can, for example, be mechanically connected to one another via a connecting shaft 24 so that the flexible pulling device 12 of the two masts 9, 10 revolve at exactly the same speed (see FIG. 5). By providing a connecting shaft 24, it is basically also possible to provide only a single drive motor as the drive device 18 for the flexible pulling device 12 of the two masts 9, 10.

For the purpose of lifting and lowering, the loading platform 11 is connected to one of the two strands 22, 23 of the two flexible pulling devices 12 of the masts 9, 10, which strands run in the same direction when the drive devices 18 are actuated, for example, in each case to strand 23.

Figure 10:
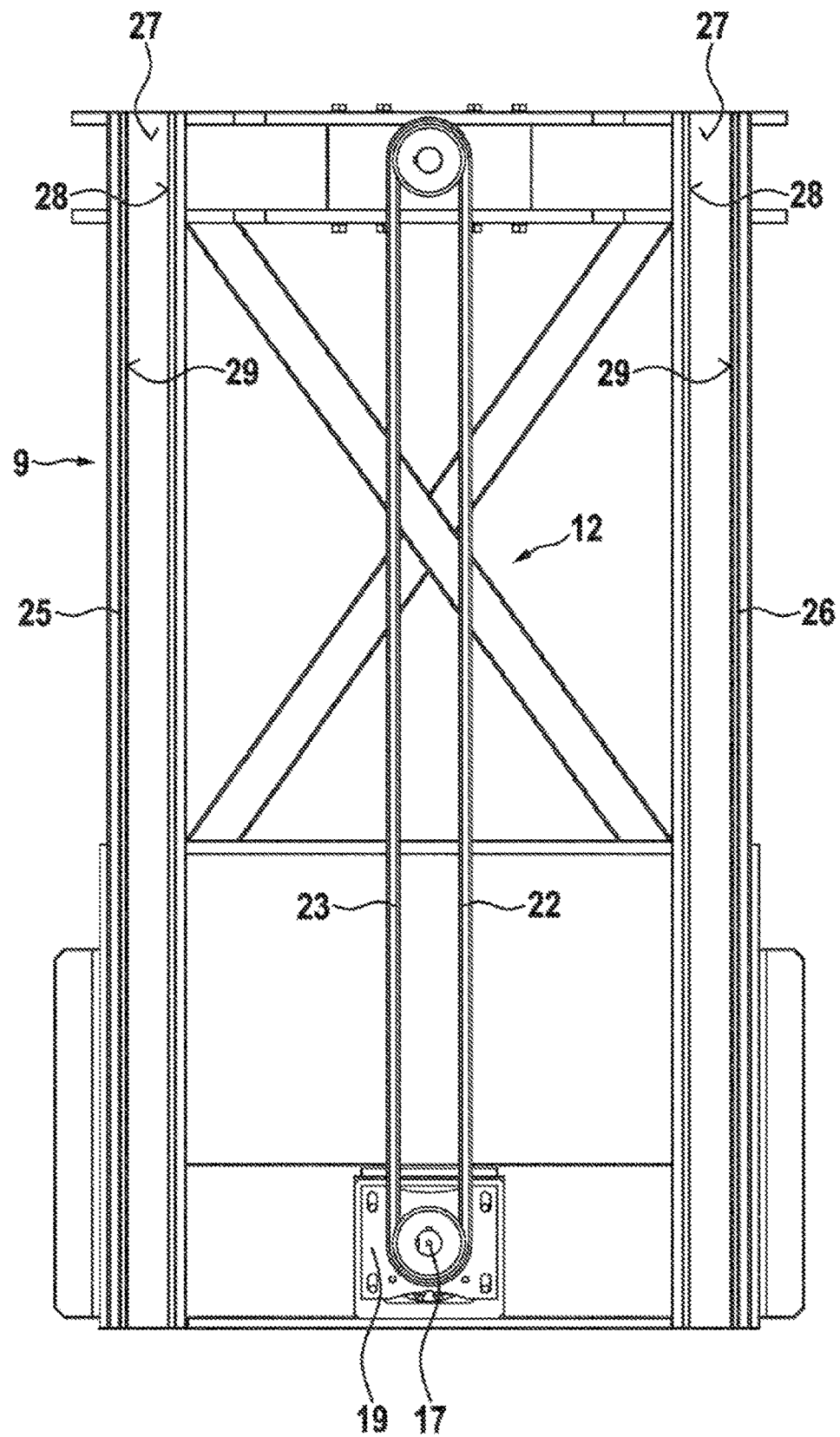
FIG. 10 is a front view of the front side of the same mast.
Figure 11:
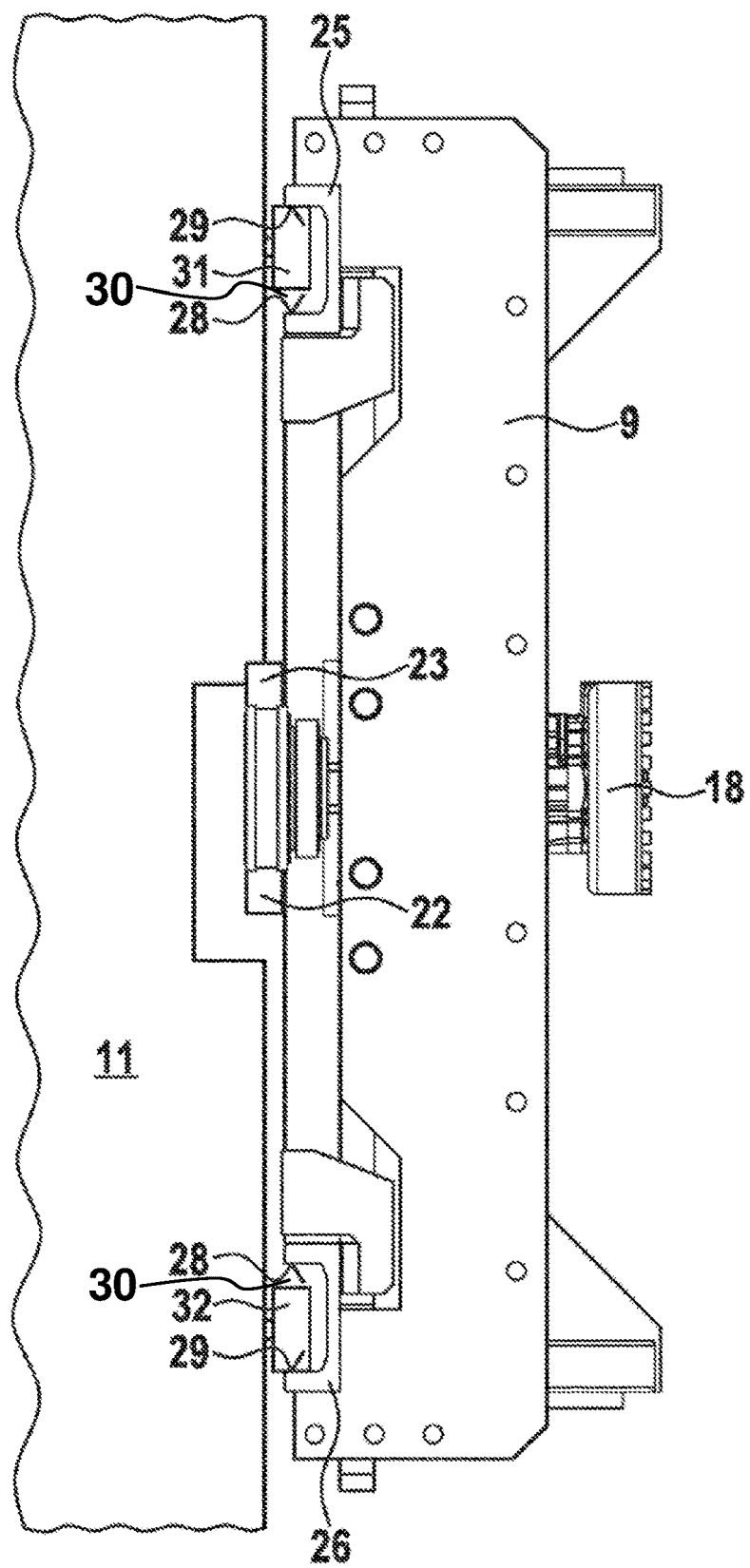
FIG. 11 is a view of the same mast from above.

Guide profiles 25, 26 are provided on the masts 9, 10 to guide the loading platform 11 on the masts 9, 10, as can be seen in particular in FIGS. 10 and 11 using the example of mast 9. Each guide profile 25, 26 has an internal cross section which is designed to be approximately C-shaped. It has a base surface 27 and two mutually parallel side surfaces 28, 29 extending perpendicularly from the base surface 27 to the open profile side 30.

The guide profiles 25, 26 are arranged on the corresponding mast 9, 10 so that their open profile sides 30 face one another.

As can be seen in FIG. 11, the loading platform 11 has two guide rollers 31, 32 on its side facing the mast 9, which guide rollers 31, 32 in the illustrated embodiment each roll on one of the two outer side surfaces 29 of the guide profiles 25, 26 and thus guide the loading platform 11 to prevent displacements relative to the mast 9 in the F-R direction of the industrial truck 100. The loading platform 11 can of course also be designed to correspond to the side facing the other mast 10 (not shown in FIG. 11). The mast 10 also has guide profiles 25, 26. It should finally be pointed out that the guide rollers 31, 32 can also be arranged so that they both roll on the central side surfaces 28 of the guide profiles 25, 26. Further guide rollers (not shown in the drawing) can also be provided offset in the longitudinal direction of the guide profiles 25, 26 relative to the guide rollers 31, 32, which further guide rollers in turn roll on one of the side surfaces 28 or 29. The loading platform can as a result also be secured against tilting in an axis running perpendicular to the plane of the drawing in FIG. 10 with the aid of the guide profiles 25, 26.

A major advantage of the design and arrangement of the guide profiles 25, 26 and the guide rollers 31, 32 rolling therein is that forces acting on the loading platform 11 in the F-R direction, as can occur in particular during loading and unloading, are directly absorbed by the two masts 9, 10, and no further, possibly technically complex measures are required therefor.

Figure 7:
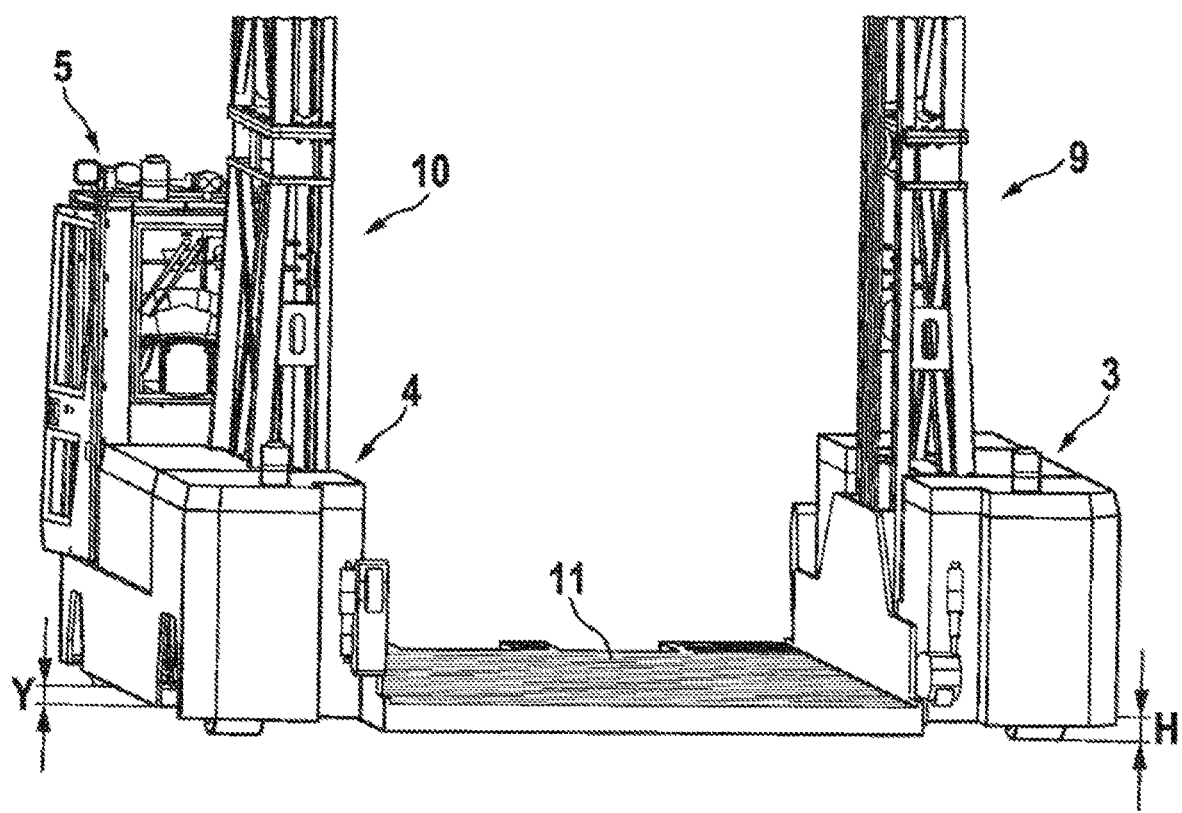
FIG. 7 is a partial view of the same embodiment in a view according to FIG. 1 from the rear.

As already mentioned above, the industrial truck 100 has a particularly low loading and unloading height H. As can be seen in FIG. 7, this is substantially identical on the front axle side and the rear axle side. This is caused by the design of the chassis 1 with the cross members 8 in contrast to the known U-shaped design of the chassis with a single, rear cross member 8, which must be designed considerably more voluminous in cross section than the two cross members 8 which are spaced apart in the longitudinal extension in order to achieve the required chassis rigidity of the industrial truck 100. In order to be able to minimize the loading and unloading height H, the loading platform 11 has recesses 33 on the underside for one of the cross members 8, so that the loading and unloading height H only slightly exceeds the vertical extension of the cross members 8 from the ground.

Each of the cross members 8 can comprise two struts 34, 35 which run parallel to one another and have a rectangular, for example, a square cross section. The struts 34, 35 are connected to one another via a connecting plate 36.

Figure 8:
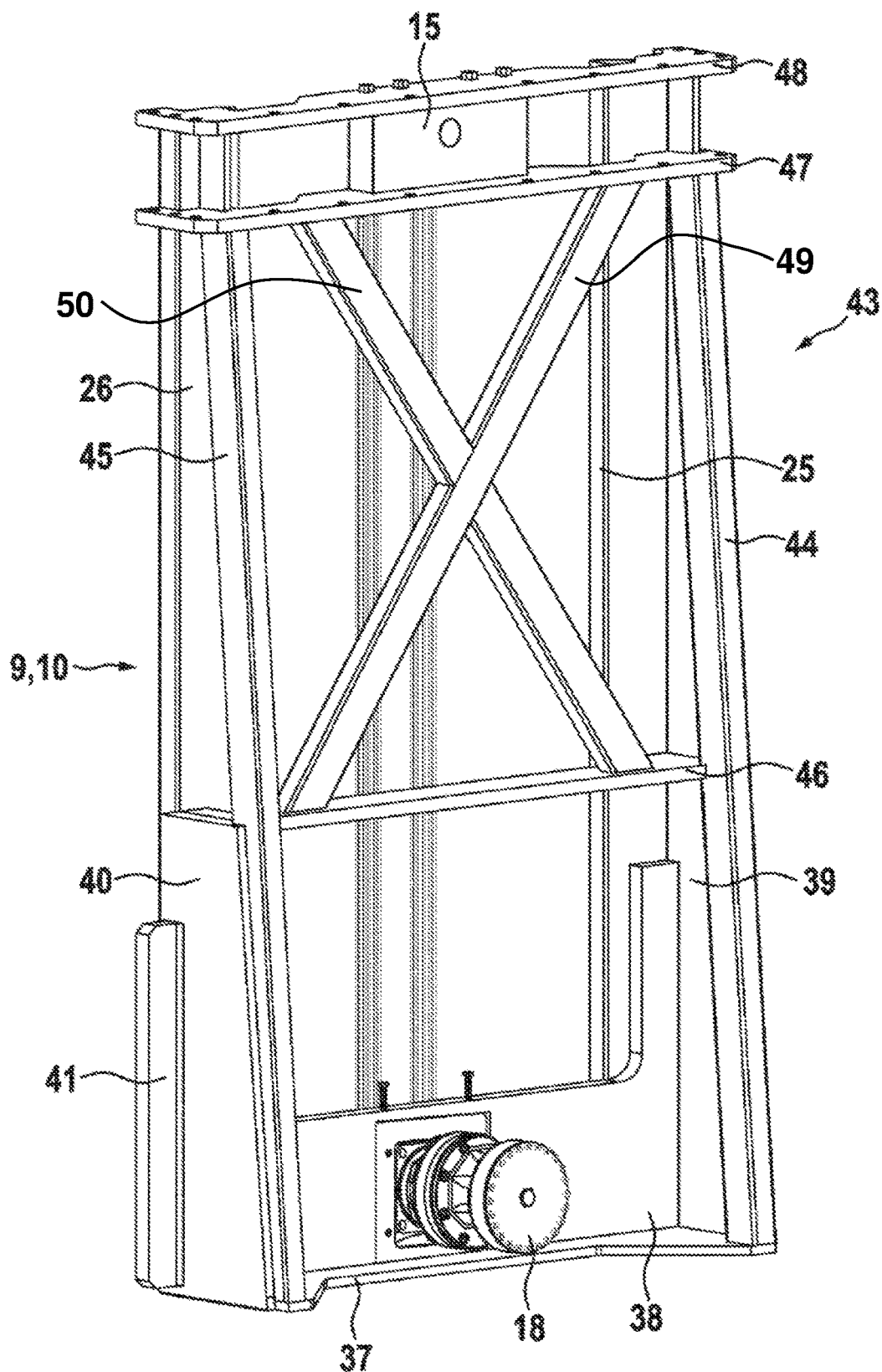
FIG. 8 is a perspective rear view of a first embodiment of one of the two masts of the industrial truck according to the present invention.
Figure 9:
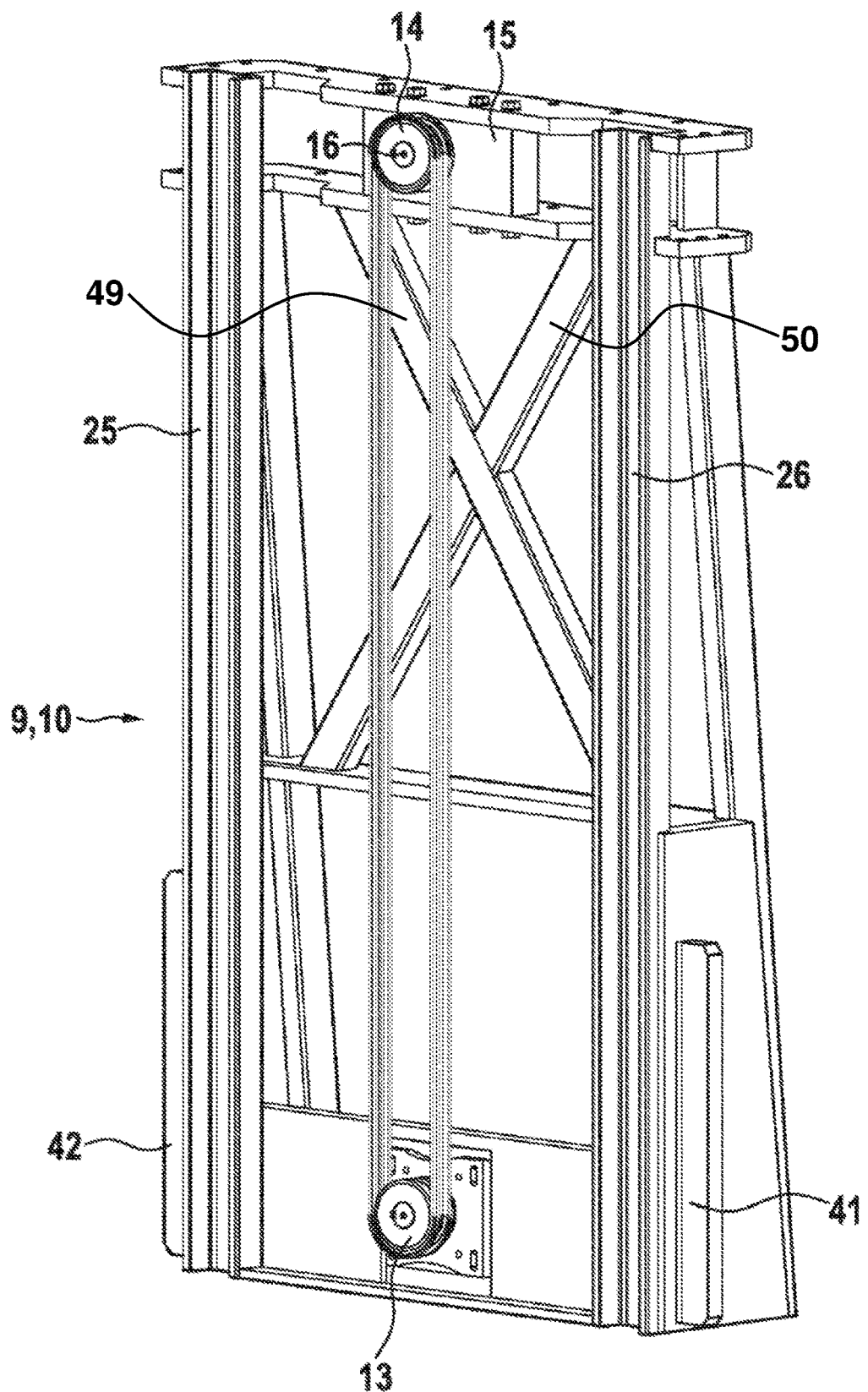
FIG. 9 is a perspective front view of the mast shown in FIG. 8.

As can be seen, for example, in FIGS. 8 and 9, the masts 9, 10 each have a base plate 37 from which a lower frame component 38, which comprises the bearing block receptacle 20, extends upward. The lower frame component 38 is approximately designed so as to be U-shaped when viewed from the front or the rear of the mast 9, 10. Side walls 39, 40 of the mast, which are provided with lateral stiffening ribs 41, 42, rest on the outer sides of its two legs. A first main frame 43, which comprises lateral profiles 44, 45 connected to one another via cross struts 46, 47, 48, extends upward from the base plate 37. Diagonal strutting 49, 50 arranged in an X like manner extend between the lower cross strut 46 and the central cross strut 47. The guide profiles 25, 26 are fastened to the base plate 37, the side walls 39, 40, and the cross struts 46, 47, 48. The so constructed mast is characterized by considerable torsional rigidity combined with low weight and low manufacturing costs.

In the embodiment of the mast shown in FIGS. 8, 9 and 10, the upper bearing block 15 is arranged between the central cross strut 47 and the upper cross strut 48. As can be seen by comparison with the further embodiment of a mast 9, 10 shown in FIGS. 14 to 18, the bearing block 15 between the cross struts 47 and 48 is missing in this further embodiment. A further main frame 51 instead extends upward from the upper cross strut 48. It has a lower cross strut 52 which is screwed to the upper cross strut 48 of the first main frame 43. A central cross strut 55 is connected to the lower cross strut 52 via diagonal strutting 53, 54. The bearing block 15 is arranged between this and an upper cross strut 56. The guide profiles 25, 26 extend from the base plate 37 to the upper cross strut 56; the guide profiles 25, 26 are, for example, designed in the mast shown in FIGS. 14 to 18 so as to be longer by adding guide profile portions 57 compared to the guide profiles shown in FIGS. 8 to 10. The flexible pulling device 12 accordingly also has a greater length in the embodiments shown in FIGS. 14 to 18 than in those shown in FIGS. 8 to 10.

From the above explanations, it can be seen that, due to the modular construction of the mast with a variable number of diagonal strutting and cross struts, it is possible to easily provide masts of different lengths that are adapted to user requirements. It can further be seen that, due to this modular structure, already existing industrial trucks comprising corresponding masts can be adapted to changing requirements with only little effort in terms of the maximum lifting height that can be achieved therewith. For this purpose, only segments, as denoted by D in FIG. 15, together with the associated guide profile portions 57 of the corresponding mast 9, 10 must be removed or supplemented, and the flexible pulling device 12 must be replaced by one of suitable length.

The present invention is not limited to embodiments described herein; reference should be had to the appended claims.

LIST OF REFERENCE NUMERALS

100 Industrial truck
1 Chassis
2 Loading region
3 Side region

4 Side region
5 Driver's cab
6 Front wheels
7 Rear wheels
8 Cross member
9 Mast
10 Mast
11 Loading platform
12 Flexible pulling device
13 Lower pulley
14 Upper pulley
15 (Upper) Bearing block
16 Axis
17 Drive shaft
18 Drive device
19 Bearing block
20 Bearing block receptacle
21 Clamping screw
22 Strand
23 Strand
24 Connecting shaft
25 Guide profile
26 Guide profile
27 Base surface
28 (Central) Side surface
29 (Outer) Side surface
30 Open profile side
31 Guide roller
32 Guide roller
33 Recesses
34 Strut
35 Strut
36 Connecting plate
37 Base plate
38 Lower frame component
39 Side wall
40 Side wall
41 Stiffening rib
42 Stiffening rib
43 Main frame
44 Lateral profile
45 Lateral profile
46 Cross strut
47 Central cross strut
48 Upper cross strut
49 Diagonal strutting
50 Diagonal strutting
51 Further main frame
52 Lower cross strut
53 Diagonal strutting
54 Diagonal strutting
55 Central cross strut
56 Upper cross strut
57 Guide profile portion
A Front axle
B Rear axle
C Container
D Segment
H Loading and unloading height
S Steering axles
R Reverse direction of travel
T Tensioning direction
F Forward direction of travel
X Transverse extension
Y Overall height
Z Lifting and lowering direction

What is claimed is:

1. An industrial truck comprising:
a loading platform; and
two masts which are arranged opposed to each other, the two masts being configured to lift and to lower the loading platform which is arranged between the two masts in a lifting and lowering direction, each of the two masts comprising,
two pulleys which are arranged spaced apart in the lifting and lowering direction,
a flexible pulling device which is configured to revolve around each of the two pulleys, and
a drive device which is configured to rotationally drive at least one of the two pulleys,
wherein,
each of the two masts further comprises,
a bearing block receptacle, and
a bearing block which is arranged in the bearing block receptacle, and
at least one of the two pulleys of each mast is mounted in the bearing block so as to be movable in a tensioning direction.

2. The industrial truck as recited in claim 1, wherein each flexible pulling device further comprises two strands each of which extend in the lifting and lowering direction.

3. The industrial truck as recited in claim 2, wherein,
the two strands are parallel with respect to each other, and
the loading platform is connected to the two strands of each flexible pulling device of the two masts.

4. The industrial truck as recited in claim 1, further comprising:
a connecting shaft,
wherein,
the two pulleys each comprise a lower pulley,
the drive device comprises a drive shaft,
at least one lower pulley of the two masts is non-rotatably connected to the drive shaft of the drive device, and
each lower pulley of the two masts is mechanically connected to each other via the connecting shaft.

5. The industrial truck as recited in claim 4, wherein, each lower pulley of the two masts is non-rotatably connected to the drive shaft of the drive device.

6. The industrial truck as recited in claim 1, wherein,
each flexible pulling device comprises two parallel V-belts, and
each of the two pulleys are designed as double belt pulleys.

7. The industrial truck as recited in claim 1, wherein each of the two masts further comprises a first main frame.

8. The industrial truck as recited in claim 7, wherein each of the two masts further comprises at least one second main frame which is attachable to the first main frame.

9. The industrial truck as recited in claim 8, wherein,
the first main frame comprises an upper cross strut,
the at least one second main frame comprises a lower cross strut, and
the lower cross strut is attachable to the upper cross strut.

10. The industrial truck as recited in claim 1, further comprising:
travel drives; and
steering motors,
wherein,
each of the travel drives, the steering motors, and the drive device are electrically operated.

* * * * *